March 19, 1968

F. MILANI 3,373,791

FLEXIBLE CURTAIN FOR MOVABLE PARTITIONS OR WALLS
AND PROCESS AND DEVICE RELATIVE THERETO

Filed Nov. 24, 1964

INVENTOR.
Franco Milani
BY
Stevens, Davis, Miller & Mosher
ATTORNEYS

March 19, 1968 F. MILANI 3,373,791
FLEXIBLE CURTAIN FOR MOVABLE PARTITIONS OR WALLS
AND PROCESS AND DEVICE RELATIVE THERETO
Filed Nov. 24, 1964 5 Sheets-Sheet 2

INVENTOR.
Franco Milani
BY
Stevens, Davis, Miller & Mosher
ATTORNEYS

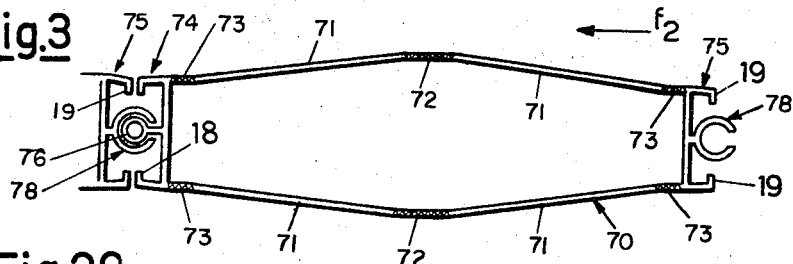
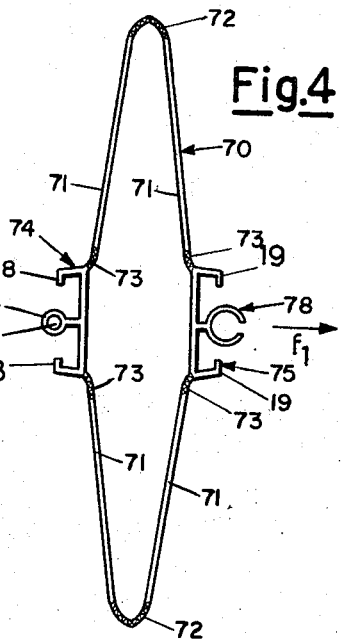
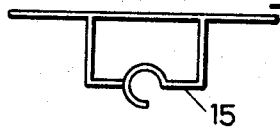
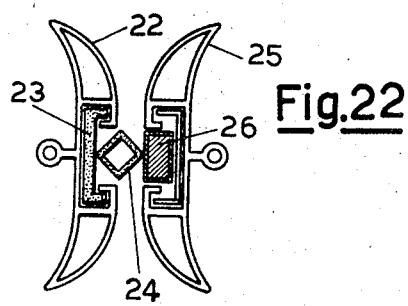
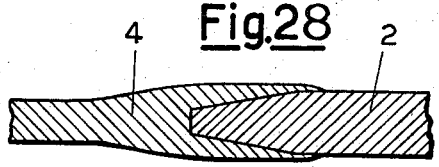
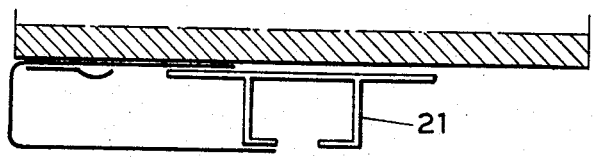

March 19, 1968            F. MILANI            3,373,791
FLEXIBLE CURTAIN FOR MOVABLE PARTITIONS OR WALLS
AND PROCESS AND DEVICE RELATIVE THERETO
Filed Nov. 24, 1964            5 Sheets-Sheet 4
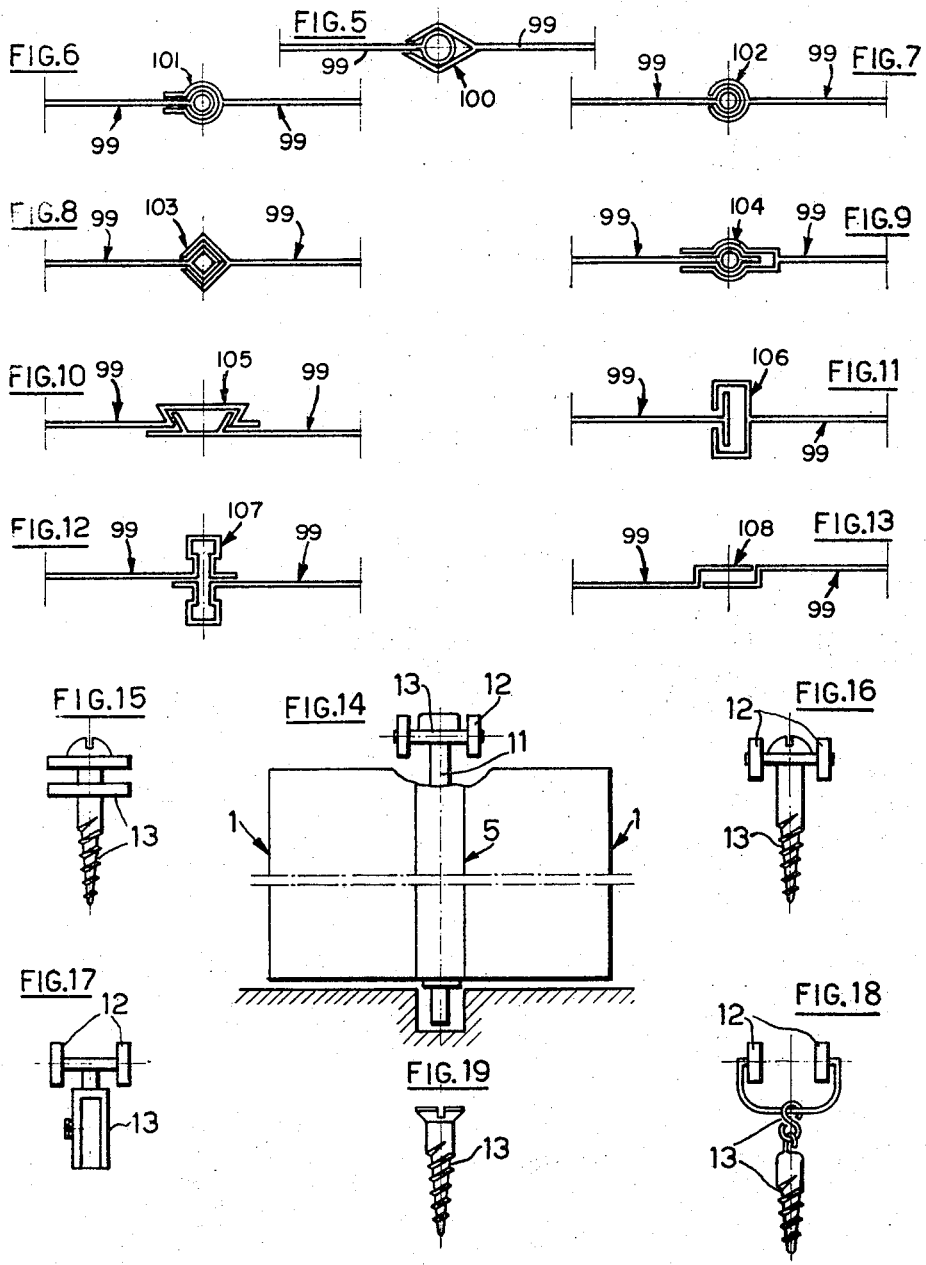
INVENTOR.
Franco Milani
BY
Stevens, Davis, Miller & Mosher
ATTORNEYS

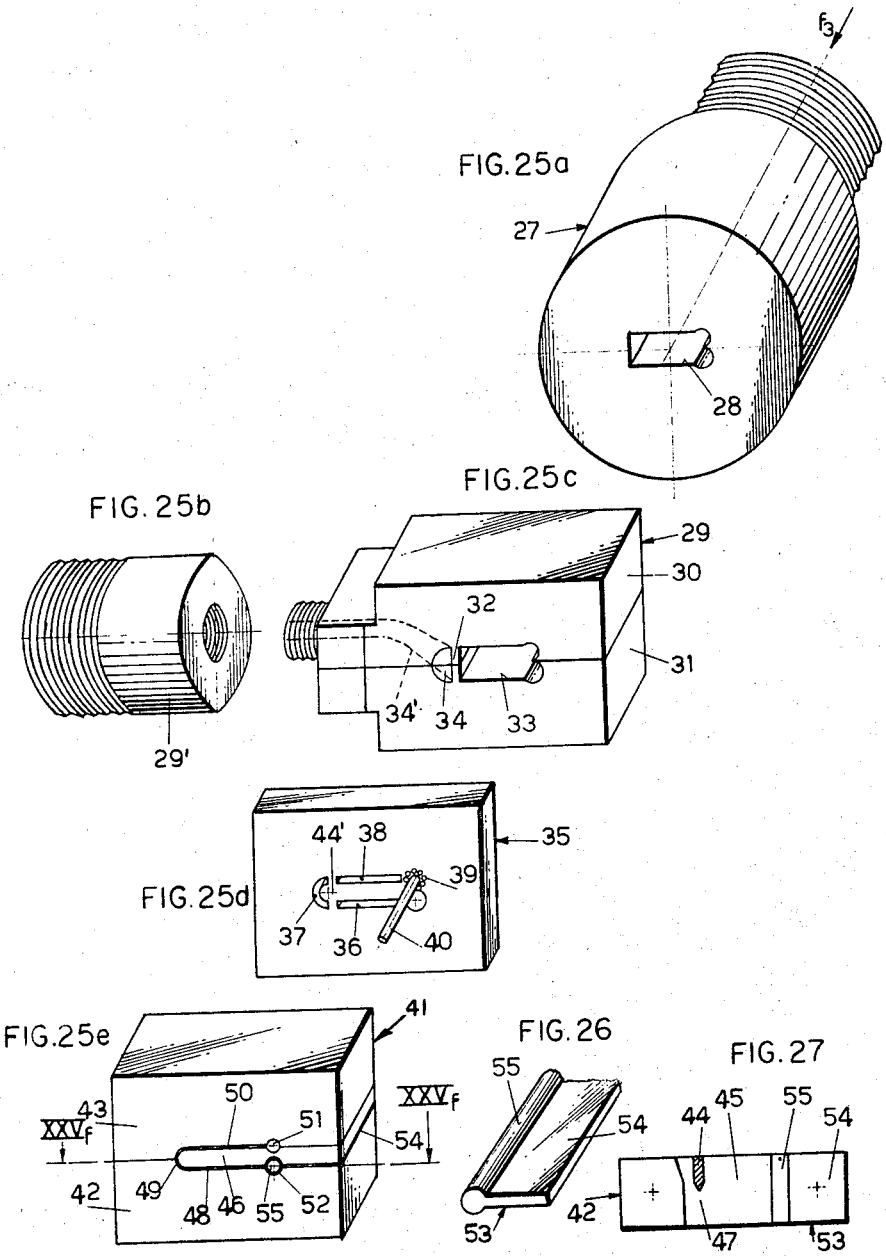

United States Patent Office 3,373,791
Patented Mar. 19, 1968

3,373,791
FLEXIBLE CURTAIN FOR MOVABLE PARTITIONS OR WALLS AND PROCESS AND DEVICE RELATIVE THERETO
Franco Milani, Fagnano Olona, Italy, assignor to Milani Resine S.p.A., Fagnano Olona, Varese, Italy, a company of Italy
Filed Nov. 24, 1964, Ser. No. 413,416
Claims priority, application Italy, Dec. 2, 1963, Patent 709,394
3 Claims. (Cl. 160—181)

It is an object of the present invention to provide a flexible curtain for movable partitions or walls and a process and device relative thereto.

As is known, movable partitions or walls are being used at present to isolate a part of a room. Such partitions are formed of a double curtain of flexible material, which can be opened and closed at will. The curtains conventionally used are cumbersome and rather difficult to use owing to the metallic framing with hinged members forming the curtain. The curtain according to the present invention instead is very light and is very easy to handle; moreover, it is of simple, easy and economical construction. These and other advantages will appear from the following description of some embodiments, which, however, are given merely by way of example without limitation of the construction and use of the elements as well as of the equipment, of the invention. In the construction of the curtain, use is made of structural shapes obtained by the union of two kinds of plastic materials of different degrees of stiffness (which may even be constituted by the same plastic material more or less plasticized) so as to comprise two rigid parts united by a flexible part; which is a principle known per se already.

The curtain according to the present invention is essentially characterized in that it is constituted by a succession of longitudinal elements formed by flexible shaped parts alternated with rigid shaped parts, between one element and the contiguous one there being provided longitudinal joints adapted to lock said elements together.

The process for obtaining the curtain according to the present invention is essentially characterized in that the flexible parts and the alternate rigid ones in every element are extruded and joined with one another sequentially.

The device for obtaining elements forming the curtain is essentially characterized by an extruder head of composite structure and fed from two sources respectively of rigid material and of flexible material and in which said materials in the plastic state are brought through respective conduits to constitute the alternate rigid and flexible parts of each element of the curtain, said parts becoming joined together in succession to form the element and the terminal extensions.

The present invention will now be described in more detail merely by way of example without limitation, as already mentioned, with reference to the accompanying drawings, wherein:

FIG. 1 diagrammatically represents in plan view a curtain according to the present invention;

FIGS. 3 and 4 show in open position (expanded) and in closed position (retracted) another type of curtain according to the invention;

FIGS. 5 to 13 represent various kinds of joints to be adopted with curtains according to the invention;

FIGS. 14 to 19 illustrate various types of suspensions and carriages to be adopted for the stroke of the curtain according to the invention;

FIGS. 20 to 24 respectively represent the accessory structural shapes, namely:

FIG. 20, a small upper guide track;

FIG. 21, a structural shape for lateral attachment;

FIG. 22, a structural shape for abutment and counterabutment;

FIG. 23, a structural shape for abutment fixed to the wall;

FIG. 24, a particular structural shape for a gableboard, which might even be defined a structural shape for framing the opening of a door;

FIGS. 25 (a, b, c, d, e,) shows a diagrammatical view in perspective of separate parts of one embodiment of the head of an extruder device for obtaining elements for curtains according to the invention, namely:

FIG. 25(a), the part of the head for the inlet for the rigid material;

FIG. 25(b), the part of the head for inlet for the flexible material;

FIG. 25(c), the part of the head for coupling the two materials rigid and flexible;

FIG. 25(d), the male-carrier conveyor that follows, in the direction of movement of the materials, the part shown in FIG. 25(c);

FIG. 25(e), the die for the issue of the composite material (rigid, flexible, rigid);

FIG. 26, a component part of the die shown in FIG. 25(e);

FIG. 27, the plan view from top of the lower component part of the die of FIGURE 25(e), which renders evident the junction or welding zone of the materials, and FIG. 28 shows in enlarged cross-section a preferred embodiment of the junction between the flexible material and the rigid material.

Figure 1:
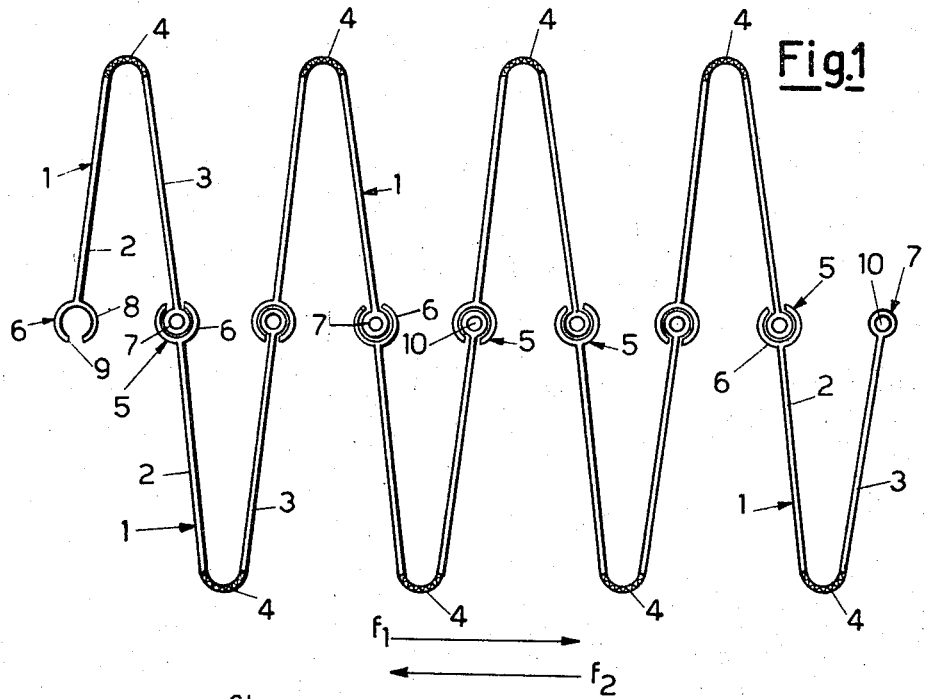

With reference firstly to FIG. 1, the curtain according to the present invention (which is represented in retracted position), essentially comprises a plurality of elements 1, for instance obtained with the device of FIG. 25, substantially equal, each one of which is constituted by two parts of rigid material 2 and 3 and by an intermediate part of flexible material 4. The parts 2 and 3 of contiguous elements 1 are rigidly connected by a joint, indicated in its whole by 5 and constituted by the coupling of the ends 6 and 7 presented by the parts 2 and 3 of every element 1. Each end 6 is shaped by way of a fork with arms 8 and 9 constituting a fork with spherical cross-section, into said fork there being introducible by forcing the end 7 of a part 3 of an element 1; each end 7 is shaped by way of an eyelet with a central hole 10 provided for the passage of stay rods 11 (FIG. 14) for sustaining the curtain. Every stay-rod 11 is provided with wheels 12 (FIGS. 14 to 18) that are mounted with connections 13 (FIGS. 15 and 19) and are slidable on the track 14 (FIG. 20).

The curtain is expansible and can be folded respectively along the arrows $f_1$ and $f_2$, as indicated in FIGS. 1 to 4.

Figure 2:
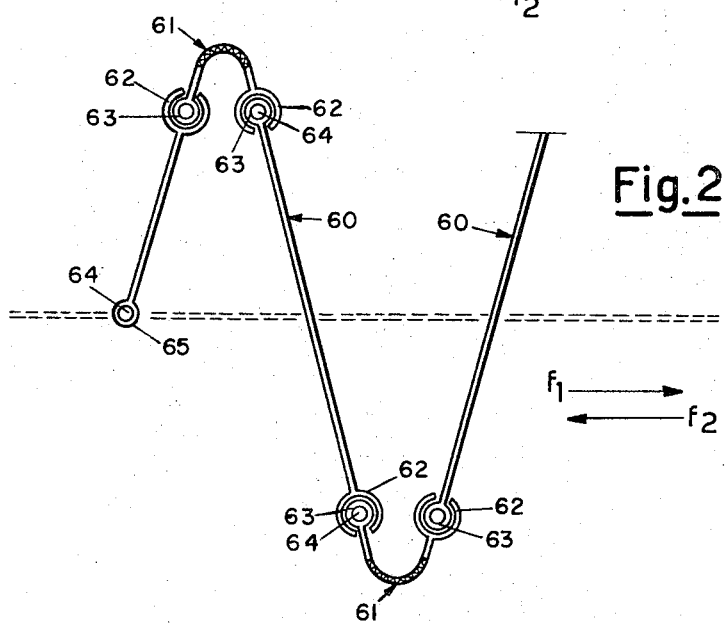
FIGS. 2, 2a and 2b show analogously another embodiment of a curtain according to the invention.

FIGURE 2 shows a variant by way of example of embodiment (the curtain being here too shown in retracted position) in which there is a rigid part, indicated by 60 and convex at the contiguous rigid part 60, by two flexible parts 61. Every part 2 presents at its ends respectively a fork 62 and an eyelet 63 with hole 64. Every part 61 is respectively provided at its ends with a fork 62 and with an eyelet 63 with a hole 64; these ends of every part 61 can be combined precisely with ends 63 and 62 of contiguous parts 60.

At the end towards the wall every curtain will present an end like the one indicated by 65 in FIGURE 2, which can be combined with the structural shape 15 of FIG. 21.

Another variant given as an example of embodiment is represented in FIGS. 3 and 4, which show the curtain according to the invention respectively in expanded position and in retracted position. According to this variant, every element 70 is composed of two pairs of rigid parts indicated by 71 which are connected with each other by central flexible parts 72 and by other flexible parts 73 to rigid structural shapes of termination of every element 70, respectively indicated by 74 and 75.

The structural shape 74 carries centrally rigid an eyelet end 76 with a hole 77 and the structural shape 75, an end shaped like a fork 78; then both are provided with extensions 79 and 80 cooperating with those of contiguous elements 70, when the curtain is expanded (FIG. 3).

FIGS. 23 and 24 represent structural shapes 20 and 21 respectively for fixed wall abutment and for door-opening, suitable for curtains according to the invention.

FIGURE 22 represents an interesting constructive particular, it comprises: an abutment structural shape formed by a part 22 of rigid plastic material and one 23 of flexible plastic material much similar to those used for refrigerator doors and that can contain in its hollow part having rectangular cross-section a static magnet 24. The counter-abutment structural shape comprises a part 25 of rigid plastic material, substantially similar to that 22, carrying inside a metallic structural shape 26. One obtains in that way the automatic closure of the two leaves of a curtain or mobile wall according to the present invention, without using any jacks, which are difficult to apply owing to the minimal space available. Such shaped parts 22 and 25 may even serve as handles. Also the structural shape of FIG. 23 will have to be provided inside with a metallic shape such as the one of FIG. 22, so as to close also doors or walls having only one leaf.

Now with reference to FIG. 25, there is represented therein compositely a perspective view of separate parts of an embodiment of an extruder device for obtaining elements for curtains according to the invention, for instance of the kind as in FIG. 1.

In said FIG. 25 is shown in (a) the inlet head 27 for the rigid plastic material, that is forwarded along the arrow $f_3$, and carrying an orifice 28 having a cross-section close to that of the two branches 2 and 3 of the element 1. The part 27 is followed in (c) by a part 29 conveniently in two pieces 30 and 31 superimposed upon each other, which present two extensions which form a baffle 32, which separate the orifice 33, substntially similar to 28, from an orifice 34, substantially semi-circular, which form the part 29' shown in (b) is fed with the flexible plastic material destined to constitute the part 4 of the element 1 through the connection 34'.

The part 29 is followed by the part 35 that carries a group of partial orifices adapted to set the rigid and flexible plastic materials to assume the configuration such as to form in succession the parts 2, 4, 3 of the element 1. In fact the orifice 36 will constitute the part 2, the orifice 37 in half-circle, the part 4, and the orifice 38, the part 3.

In order to obtain the eyelet 7 with the hole 10, the necessary material is extruded through a circular row of small holes 39 around a core 40. The fork-shaped part 6 begins to be shaped in the hole 47 beneath the core 4.

Adjacent to the part 35 there is the part 41 which completes the extruder head. This too is formed by a plurality of pieces. Two pieces should be noted which are substantially similar and superimposed, 42 and 43. Among these there is a baffle 44 arranged adjacent the one 44' provided in the piece 35 between the cavities 36, 37, 38. Said baffle 44 does not occupy, as shown in FIG. 27, the whole depth of the groove 45 formed by the two pieces 42 and 43, which is formerly occupied by the piece 46, visible in FIG. 25(e), behind which is terminated the baffle 44, in the zone 47, the union between the rigid plastic material and the flexible one taking place which together—issuing in front of the piece 41 with the partial cavities 48, 49, 50, constituted by the pieces 42, 43, 46 and placed adjacent those 36, 37, 38—originate the element 1 formed by the union of the two rigid parts 2 and 3 with interposition of the flexible part 4.

The vacity 50 is terminated with a hole 51 from which issues the eyelet 10 caused by the core 40. The cavity 48 is terminated by a space shaped like an open ring 52 formed by the pieces 42, 46 and by the piece 53, visible in perspective in FIG. 26, and in plan view in FIG. 27, provided with an appendix 54 with a cylindrical rim 55. One thus forms the fork 6 at the end of the part 2 of the element 1.

Figure 2A:
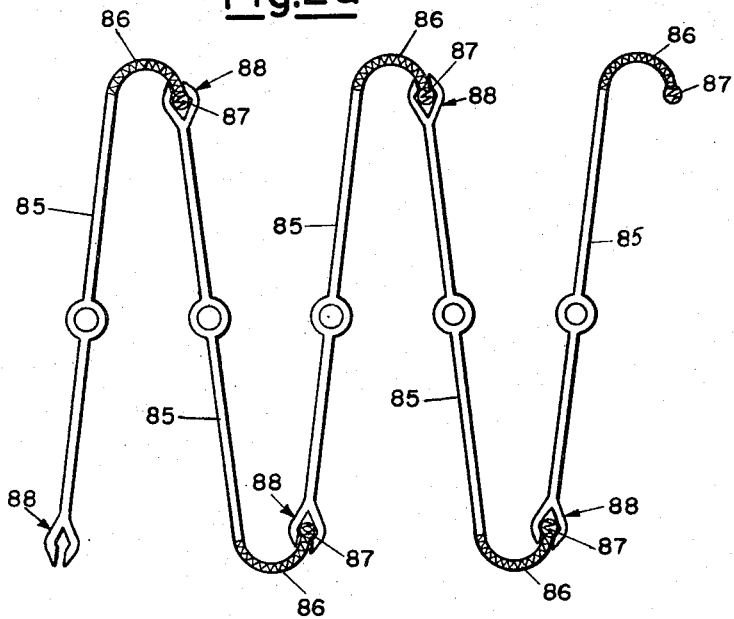
Figure 2B:
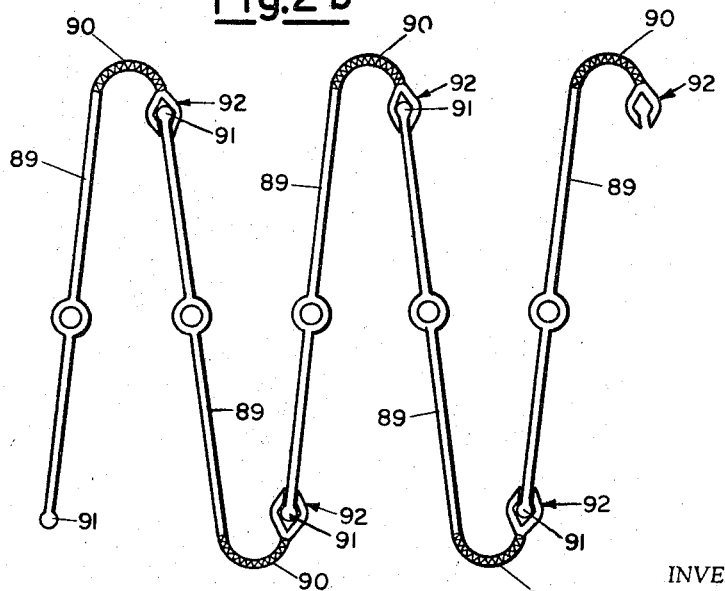

Though only some embodiments of the invention have been described, there are however possible constructive variants without departing from the scope of the invention. FIG. 2a shows an alternate embodiment wherein each member 85 has on one end a flexible portion 86 terminating in a circular rim 87. The other end of the member 85 terminates in a fork 88 which engages with the rim 87. FIG. 2b is a modification of the embodiment of FIG. 2a wherein each member 89 has a flexible portion 90 on one end and a rim 91 on the other end. The portion 90 terminates in a fork 92 which engages with the rim 91.

FIGS. 5 to 13 illustrate alternate engaging means generally noted as 100 to 108 on the respective ends of panel members 99.

The embodiments of the invention in which an exclusive property or privilege is claimed are defined as follows:

1. A foldable curtain comprising a plurality of successive contiguous elements, each said element being substantially alike, said element comprising first and second rigid members longitudinally joined by an intermediate flexible third member, complementary engagement means on the terminal ends of said first and second members for mutual substantially permanent engagement of one element with its adjacent element, said terminal ends comprising enlarged extensions of constant cross sections, one of said extensions being substantially channel shaped for slidably receiving therein a complementary substantially tubular extension of the adjacent element, and suspension means at one transverse end of each of said elements, said suspension means comprising means for engaging with an inner portion of said tubular extension.

2. A foldable curtain according to claim 1, wherein said first and second rigid members are substantially of equal size.

3. A foldable curtain according to claim 1, in which said first and second rigid members and said intermediate third member are made of the same material having different degrees of plastification.

References Cited

UNITED STATES PATENTS

| | | | |
|---|---|---|---|
| 1,426,969 | 8/1922 | Dunham | 160—188 |
| 1,827,718 | 10/1931 | Whitney | 160—84 |
| 2,311,470 | 2/1943 | Ritter | 160—231 |
| 2,544,008 | 3/1951 | Coleman | 160—229 |
| 2,585,645 | 2/1952 | Freitag | 160—206 |
| 2,795,272 | 6/1957 | McBerty | 160—199 |
| 2,829,081 | 4/1958 | Sweem | 160—84 X |
| 2,871,934 | 2/1959 | Harter | 160—173 |
| 2,885,000 | 5/1959 | Merrill | 160—199 X |
| 2,894,573 | 7/1959 | Rosenfeld | 160—84 |
| 2,915,115 | 12/1959 | Reynolds | 160—84 |
| 3,053,318 | 9/1962 | Artman | 160—231 |
| 3,076,499 | 2/1963 | Zoll et al. | 160—235 X |
| 3,118,702 | 1/1964 | Kale et al. | 160—235 X |

DAVID J. WILLIAMOWSKY, *Primary Examiner.*

HARRISON R. MOSELEY, DENNIS L. TAYLOR, *Examiners.*